United States Patent
Chattell

(10) Patent No.: US 10,424,286 B2
(45) Date of Patent: Sep. 24, 2019

(54) ACOUSTIC CURTAIN

(71) Applicant: RVT Group Limited, Dartford, Kent (GB)

(72) Inventor: Timothy Chattell, Dartford (GB)

(73) Assignee: RVT Group Limited, Dartford, Kent (GB)

( * ) Notice: Subject to any disclaimer, the term of this patent is extended or adjusted under 35 U.S.C. 154(b) by 32 days.

(21) Appl. No.: 15/421,683

(22) Filed: Feb. 1, 2017

(65) Prior Publication Data

US 2018/0218721 A1    Aug. 2, 2018

(30) Foreign Application Priority Data

Jan. 27, 2017 (EP) .................................. 17153622

(51) Int. Cl.
| | |
|---|---|
| *G10K 11/168* | (2006.01) |
| *A47H 1/18* | (2006.01) |
| *B32B 3/16* | (2006.01) |
| *B32B 5/02* | (2006.01) |
| *B32B 5/18* | (2006.01) |
| *B32B 17/06* | (2006.01) |
| *F16B 1/00* | (2006.01) |
| *F16M 13/02* | (2006.01) |
| *E04B 1/82* | (2006.01) |
| *E04G 21/24* | (2006.01) |
| *E01F 8/00* | (2006.01) |

(52) U.S. Cl.
CPC ............. *G10K 11/168* (2013.01); *A47H 1/18* (2013.01); *B32B 3/16* (2013.01); *B32B 5/02* (2013.01); *B32B 5/18* (2013.01); *B32B 17/064* (2013.01); *E01F 8/0088* (2013.01); *E04B 1/8227* (2013.01); *E04G 21/24* (2013.01); *F16B 1/00* (2013.01); *F16M 13/022* (2013.01); *B32B 2307/102* (2013.01); *E04G 2021/248* (2013.01); *F16B 2001/0035* (2013.01)

(58) Field of Classification Search
CPC .......... G10K 11/168; A47H 1/18; B32B 5/02; B32B 5/18; B32B 17/054; B32B 2307/102; F16B 1/00; F16B 2001/0035; F16M 13/022
USPC ...................................................... 181/290, 30
See application file for complete search history.

(56) References Cited

U.S. PATENT DOCUMENTS 3,611,907 A * 10/1971 Wasserman ........... E04B 1/8218
    454/186
5,274,200 A * 12/1993 Das ....................... E04B 1/8218
    181/202

(Continued)

FOREIGN PATENT DOCUMENTS

| CN | 105996709 | * 10/2016 |
|---|---|---|
| GB | 2472309 A | 2/2011 |
| JP | H23-2011042969 A | 3/2011 |

OTHER PUBLICATIONS

Extended European Search Report for EP 17153622.0 dated May 30, 2017.

*Primary Examiner* — Forrest M Phillips
(74) *Attorney, Agent, or Firm* — Finnegan, Henderson, Farabow, Garrett & Dunner, LLP

(57) ABSTRACT

An acoustic curtain comprising a panel of sound absorbent material within an envelope formed from polymeric sheets, with means for attaching adjacent panels to one another, and wherein the curtain comprises a magnetic element.

16 Claims, 4 Drawing Sheets

(56) References Cited

U.S. PATENT DOCUMENTS

| | | | | |
|---|---|---|---|---|
| 7,357,219 | B2* | 4/2008 | Mafi | F24F 1/12 |
| | | | | 181/200 |
| 8,136,626 | B1* | 3/2012 | Aliev | F24F 13/24 |
| | | | | 181/198 |
| 9,788,537 | B1* | 10/2017 | Goulet | A01M 31/025 |
| 9,963,873 | B2* | 5/2018 | Hall | E04B 2/7403 |
| 2005/0056481 | A1* | 3/2005 | Mafi | F24F 1/12 |
| | | | | 181/202 |
| 2017/0358289 | A1* | 12/2017 | Israel | A61B 8/02 |

* cited by examiner

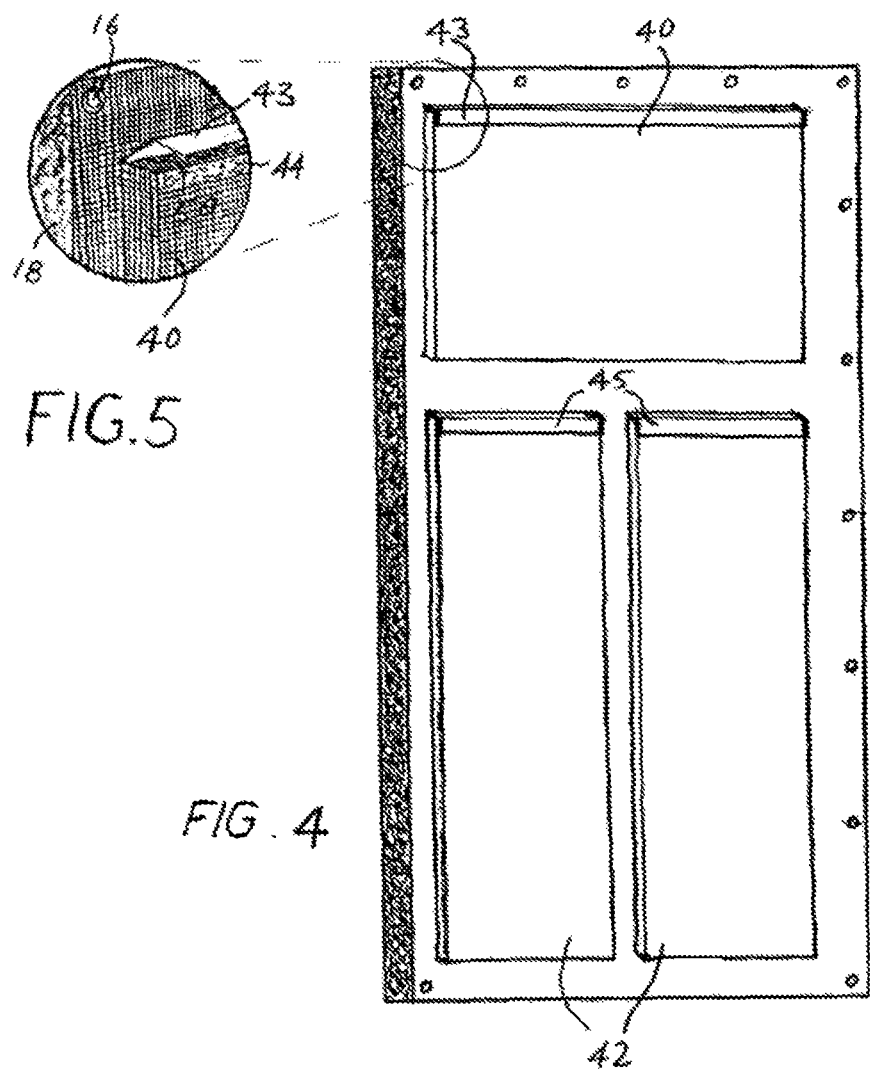

ACOUSTIC CURTAIN

This application claims priority to European Patent Application No. 17153622.0, filed on Jan. 27, 2017. The contents of this application are incorporated herein by reference.

FIELD OF INVENTION

This invention relates to an acoustic curtain for containing noise, particularly on outdoor sites such as building sites or outdoor musical events.

BACKGROUND ART

Construction companies, schools, event organisers and owners of industrial sites are becoming increasingly faced with issues relating to noise pollution, particularly on sensitive sites with surrounding residential development, hospitals or other places of work where stringent noise reduction requirements are imposed by the client or by local authorities.

Acoustic barriers which can be easily transported and erected are known in the art such as GB 2472 309. These curtains include suspension eyelets to secure the curtains to the site. Such arrangements require additional tying materials, as well as additional set up time for tying the curtains to the desired site, particularly for constructions sites and metal scaffolding. Other insulating curtains such as in U.S. Pat. No. 4,193,474 or EP 2916316, use fixing hooks or clips for attachment. However, with such arrangements, as well as additional materials and set up time, fixing to the desired site can sometimes be loose and the curtain susceptible to slight movement which may affect sound absorption performance.

There is therefore a need for improved acoustic barriers which solve one or more of the above identified issues.

SUMMARY OF THE INVENTION

The present invention provides an acoustic panel comprising a layer of sound absorbent material within an envelope formed from polymeric sheets, with means for attaching adjacent panels to one another, and wherein the panel comprises a magnetic element.

BRIEF DESCRIPTION OF THE DRAWINGS

Preferred embodiments of the invention will be described with reference to the accompanying drawings. The present invention is in no way restricted by these embodiments, and they are merely demonstrations of the invention by way of example only.

FIG. 4 is a perspective of an acoustic curtain in accordance with another embodiment of the invention.

FIG. 5 is an enlarged detail of the curtain of FIG. 4 with a pocket flap open.

DETAILED DESCRIPTION

Figure 1:
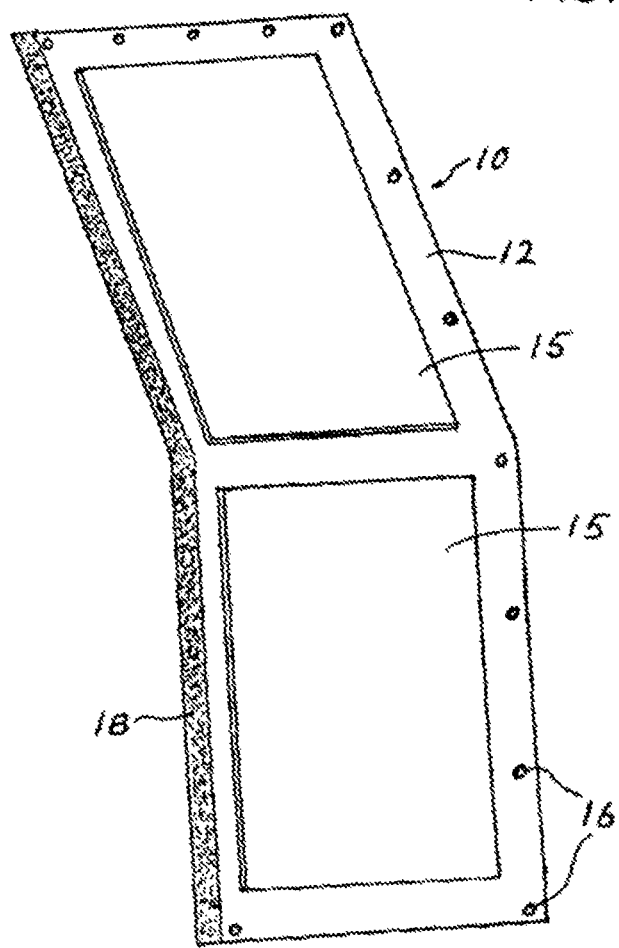
FIG. 1 is a front perspective view of an acoustic curtain in accordance with all features of the invention, but without the magnetic element.

The acoustic curtain can include a single magnetic element, but preferably there is more than one magnetic element, in particular two or even more magnetic elements per panel to ensure a balanced attachment, for example to metal scaffolding on a building site. Preferably the magnetic element or elements are in the corners of the acoustic curtain to easily align the curtain, but can also be placed alternatively or additionally along the edges of the acoustic curtain, to further facilitate fixing the curtain in position.

While not especially limited, it is preferred that the magnetic element is embedded, such as welded, in the curtain so that the magnetic element acts through a portion of the acoustic barrier to magnetically hold the acoustic barrier to the desired site. This ensures the magnet itself is integral to the curtain, thus less susceptible to any movement or any additional steps in attachment.

The magnetic element preferably has a pull force of 6.5 to 9 kg, preferably 6.9 to 8.6 kg, and a tolerance of ±0.1 mm, preferably ±0.05 mm. It is preferred that the diameter of 20 to 30 mm, preferably 25 mm and the width of 2.5 to 7.5 mm, preferably 5 mm. While not especially limited, it is preferred that the magnetic element comprises neodymium. Preferably the neodymium magnet is of grade N32 to N40, and most preferred is neodymium magnet grade N35 so that the acoustic curtain has sufficient magnetic strength without interfering with any other aspect of acoustic curtain performance. The magnetic element may also be nickel coated to help prevent corrosion. Other magnetic materials include iron and steel.

Use of a magnetic element, ensures instant attachment of the acoustic curtain to the site, typically a construction site such as metal scaffolding. Due to the magnetic attachment any movement of the curtain is also restricted, hence improving sound absorption. Depending on the material, size and number of magnetic elements, they may also be capable of absorbing sound. Hence, the overall combination of features of this arrangement results in more efficient sound absorption.

In a preferred form, the invention provides an acoustic curtain comprising two or more said panels sealed within adjacent envelopes in a common polymeric sheet and spaced from one another, whereby the curtain can be folded between adjacent panels of the curtain. In one such embodiment the panels are of equal size, in another, one panel is smaller than the other to enable the curtain to be draped over a fence or the like with most of the curtain on one side.

The polymeric sheet may for example comprise polyvinyl chloride (PVC) or silicone rubber. It may be reinforced with a fibrous material such as glass or aramid fibres. In some embodiments a woven fabric, for example of glass or aramid fibres, is coated or impregnated with a polymer, for example PVC or a fluorocarbon polymer.

It is often necessary for acoustic curtains to have high chemical resistance. Coated or impregnated glass fibre fabrics may be particularly suitable for this purpose. Woven glass fibre fabric impregnated with a fluorocarbon polymer may be particularly suitable for conferring chemical resistance.

The sound absorbent material is preferably a fibrous material, and more especially an inorganic material such as glass fibre or rock wool. Another possibility is acoustic foam, which is lighter in weight and makes the whole curtain flexible, but is more expensive. Each panel of sound absorbent material is retained within an envelope formed by two sheets of flexible polymeric material such as polyvinyl chloride (PVC) or the other materials discussed above. The overall thickness of each sound absorbent panel is preferably in a range from to 60 mm, typically 50 mm.

In some embodiments, the polymeric envelope containing each sound absorbent panel is formed on one side of a solid polymeric material and on the other side a perforated material such as PVC netting. The perforated side is positioned to face the source of noise, allowing the sound waves to penetrate the perforated layer and to be absorbed by the acoustic material. Sound waves penetrating the acoustic material are reflected back into it by the solid sheet behind it. The polymeric sheets can be sealed together by welding. Additionally or alternatively the sheets can be stitched, preferably with an aramid fibre.

To connect adjacent acoustic curtains together, suitable fastening means are provided along edges of adjacent panels, for example strips of hook and loop fastening material such as that sold under the trademark VELCRO®.

Suspension eyelets may also be provided in corners and/or along one or more edges of each curtain for securing it on site, in addition to the magnetic elements for increased rigidity of the curtain's attachment to the site. In other embodiments there are no eyelets or eyelets are not used, and only the magnetic elements are used to secure the curtain on site.

The acoustic material may be sealed between the two polymer sheets or, more preferably, may be located in pockets.

Referring first to FIG. 1, an acoustic panel generally indicated by 10 comprises a flexible double layer sheet, each of which is preferably made of woven glass fibre.

The curtain 10 comprises two acoustic panels 15, each formed by a rectangular slab of acoustic material sandwiched between the front and rear layers 12, 22 of the curtain, these layers being stitched and/or bonded together by welding around and between the two acoustic panels. Stitching is preferably with an aramid fibre such as that sold under the registered trade mark Kevlar.

Figures 2, 3:
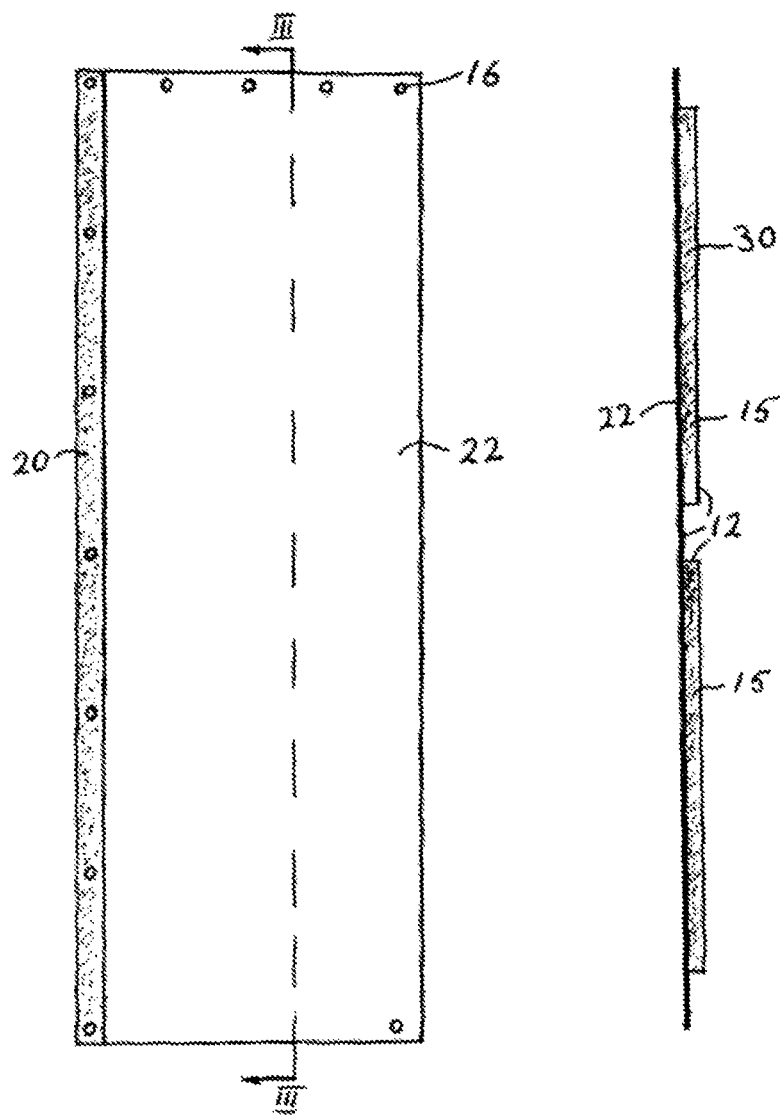
FIG. 2 is a rear elevation of the curtain of FIG. 1 when hung vertically.
FIG. 3 is a cross-section on the line 111-111 of FIG. 2.

Down one edge of the front sheet 12 is a strip 18 of hook and loop fastening material, to bond with a corresponding strip 20 on the opposite rear surface 22 of an adjacent panel (see FIG. 2).

Metal eyes 16 are provided in the four corners and along two edges of the acoustic curtain, to facilitate tying the curtain in position, for example to scaffolding on a building site.

As can best be seen in FIG. 3, the acoustic panels 15 comprise dense slabs, preferably square or rectangular, which fit into pockets between the perforated front sheet and the solid back sheet. The panels are made of an acoustic material or preferably an inorganic material such as rock wool or glass fibres. Other materials such as organic polymer fibres or particles could also be used. These panels should be densely packed and relatively rigid, so that they do not bend significantly, even though the curtain as a whole can bend between the two panels, as shown in FIG. 1, so that the panel can for example be placed around a corner, or placed over the top and one side of a site generator. The flexibility of the backing sheet also enables the curtain to be folded in half for transportation.

The acoustic curtains of the invention may be provided in any suitable shape or size. For example the curtain shown in FIG. 4 comprises two vertical lower panels 42 and a horizontal upper one 44. The general construction of the curtain of FIG. 4 is otherwise similar to that of FIGS. 1 to 3. Since however the fold line in this case is about one third of the way along the length of the curtain, stacking for storage and transport can be facilitated by folding the curtains in two and stacking them in alternate orientations. This version of the curtain is designed to hang on a Heras' or similar type fencing used to surround building sites.

The curtain of FIG. 4 differs from that of FIGS. 1 to 3 in that it has a perforated front layer 12, suitably comprising heavy duty PVC netting and a solid back layer 22 (FIG. 2) also of PVC.

The curtain of FIG. 4 also differs from that of FIGS. 1 to 3 in that instead of being sealed in between the two sheets the acoustic material is retained in pockets, each closed along one edge by a flap 43, 45, so that worn or damaged acoustic material can be replaced. It will be understood that panels of other materials, such as those described in relation to FIGS. 1 to 3 may also have this construction.

As can be more easily seen in FIG. 5, the acoustic material 50, which may be in the form of an integral slab or sheet, fits into a pocket formed by the perforated front PVC sheet 40, and is retained by a flap 43 by a hook and loop (e.g. VELCRO) connection 44.

Curtains of the invention may suitably be from 1.5 m to 2.5 m in height and from 60 cm to 1.5 m in width. Each acoustic panel may suitably be from 50 cm to 120 cm in each direction. The areas around and between the acoustic panels may suitably be from 10 cm to 15 cm in width, and the hook and loop fastening strips are preferably from 6 cm to 15 cm in width. A 10 cm overlap between adjacent curtains ensures a secure join while also providing an efficient continuous sound barrier.

In use, the acoustic curtains of the invention may be hung in rows. In the prior art arrangements this is only done using suspension eyelets 60 to secure them to scaffolding, site fencing or the like, and can be secured together with the fastening strip 18 on the front of each curtain being secured to the complementary strip 20 on the back of the adjacent panel, to form a continuous curtain. The curtain is preferably positioned with the solid layer 22 facing outwards and the perforated layer 12 facing the source of noise.

Figure 7:
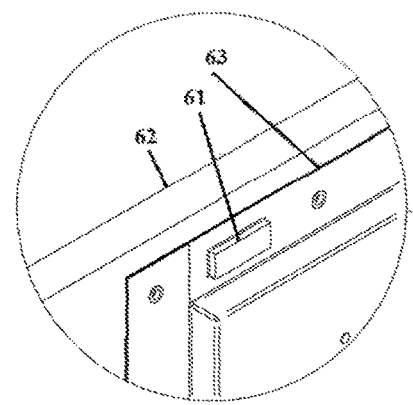
FIG. 7 is an enlarged detail of the curtain of FIG. 6.
Figure 6:
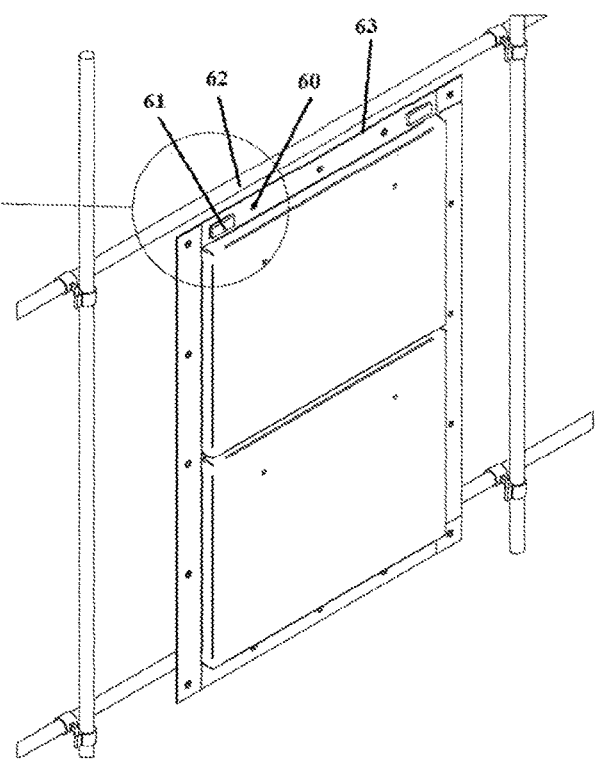
FIG. 6 is a perspective of the curtain in accordance with the present invention including the magnetic element.

FIGS. 6 and 7, shows an embodiment in accordance with the invention where the curtain 63 comprises magnets 61 retained in weld which can instantly attach to the scaffold pole 62. Eyelets 60 are provided in the structure, but their use is optional.

There is thus provided an acoustic curtain that is simple to make from easily available and relatively cheap materials that can be adapted to numerous different sites. These can be instantly attached to construction sites such as metal scaffolding. Such attachment maintains a rigid structure with more restricted movement and absorption capability, for overall more efficient and effective sound absorption. Furthermore, the curtains can assume different shapes and can be secured together to form long continuous curtains for highly effective sound absorption.

The invention claimed is:

1. An acoustic curtain configured to be hung from a metal support to form a suspended curtain, comprising:
   A panel of sound absorbent material within an envelope formed form polymeric sheets,
   A connector for attaching adjacent panels to one another,
   One or more eyelets provided along an edge of the curtain for facilitating tying of the curtain to the metal support, and
   One or more magnetic elements integral to the curtain, configured for magnetic holding of the curtain in a fixed position to the metal support and restricting movement of the curtain while the curtain is being tied to the metal support.

2. The acoustic curtain according to claim 1, wherein two or more of said panels are sealed within adjacent envelopes in a common polymeric sheet and spaced from one another, whereby the curtain can be folded between adjacent panels of the curtain.

3. The acoustic curtain according to claim 1, wherein the curtain comprises two magnetic elements.

4. The acoustic curtain according to claim 1, wherein the one or more magnetic elements are positioned in a corner of the curtain.

5. The acoustic curtain according to claim 1, wherein the one or more magnetic elements are welded in the curtain.

6. The acoustic curtain according to claim 1, wherein the one or more magnetic elements have at least one of the following properties:
  (i) pull force of 6.5 to 9 kg;
  and/or
  (ii) tolerance of ±0.1 mm.

7. The acoustic curtain according to claim 1, wherein the one or more magnetic elements have the following dimensions:
  (i) diameter of 20 to 30 mm;
  and/or
  (ii) width of 2.5 to 7.5 mm.

8. The acoustic curtain according to claim 1, wherein the one or more magnetic elements comprise neodymium.

9. The acoustic curtain according to claim 1, wherein the sound absorbent material is an inorganic fibrous material.

10. The acoustic curtain according to claim 1, wherein the sound absorbent material comprises acoustic foam.

11. The acoustic curtain according to claim 1, wherein said polymeric sheets comprise glass fibres.

12. The acoustic curtain according to claim 1, wherein said polymeric sheets comprise a chemical-resistant polymer.

13. The acoustic curtain according to claim 1, wherein said polymeric sheets comprise polyvinyl chloride.

14. The acoustic curtain according to claim 1, wherein the polymeric envelope containing the sound absorbent panel is formed on one side from a solid polymeric material and on the other side from a perforated material.

15. The acoustic curtain according to claim 1, wherein the polymeric sheets are sealed together by welding to form said envelopes, or wherein said polymeric sheets are stitched together to form said envelopes.

16. The acoustic curtain according to claim 1, wherein at least one said envelope has an opening flap at one end to allow insertion or removal of acoustic material therefrom.

* * * * *

UNITED STATES PATENT AND TRADEMARK OFFICE
CERTIFICATE OF CORRECTION

PATENT NO. : 10,424,286 B2
APPLICATION NO. : 15/421683
DATED : September 24, 2019
INVENTOR(S) : Timothy Chattell Page 1 of 1

It is certified that error appears in the above-identified patent and that said Letters Patent is hereby corrected as shown below:

On the Title Page

Column 1, item (30), "17153622" should read --17153622.0--.

In the Claims

Claim 1, Column 4, Line 56, "formed form" should read --formed from--.

Signed and Sealed this
Third Day of December, 2019

Andrei Iancu
*Director of the United States Patent and Trademark Office*